United States Patent [19]

Hiroshima et al.

[11] 4,337,099
[45] Jun. 29, 1982

[54] METHOD AND APPARATUS FOR CONDITIONING OF STEEL SURFACE

[75] Inventors: Tatsuo Hiroshima, Nishinomiya; Takahide Sakamoto, Minoo, both of Japan

[73] Assignee: Sumitomo Metal Industries, Ltd., Osaka, Japan

[21] Appl. No.: 262,067

[22] PCT Filed: Jun. 20, 1979

[86] PCT No.: PCT/JP79/00157
§ 371 Date: Apr. 10, 1980
§ 102(e) Date: Apr. 10, 1980

[87] PCT Pub. No.: WO80/02812
PCT Pub. Date: Dec. 24, 1980

[51] Int. Cl.³ .............................................. B23K 7/08
[52] U.S. Cl. ..................................... 148/9.5; 266/51; 266/74; 266/75

[58] Field of Search ............................. 266/51, 74, 75; 148/9.5

[56] References Cited

U.S. PATENT DOCUMENTS 3,508,323 4/1970 Richards .............................. 148/9 R
3,615,898 10/1971 Coffman .............................. 148/9 R

FOREIGN PATENT DOCUMENTS 45-477 1/1970 Japan .
52-42414 10/1977 Japan .

*Primary Examiner*—W. Stallard
*Attorney, Agent, or Firm*—Wenderoth, Lind & Ponack

[57] ABSTRACT

A flaw detecting unit inspects the surface of a red-hot steel material, the nail marking unit drives steel nails into the flaw in response to the flaw detection signal, and a scarfing unit scarfs the flaw starting from the nails in response to the scarfing command signal.

4 Claims, 7 Drawing Figures

Fig. 1
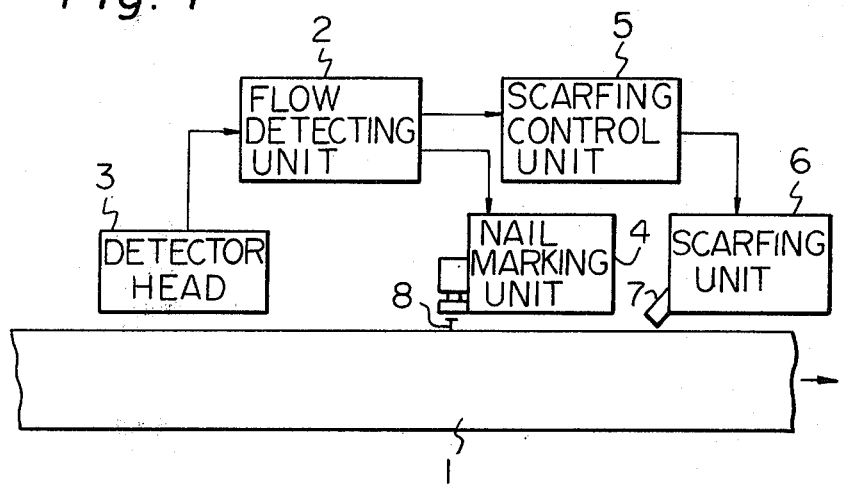
Fig. 2(A)  Fig. 2(B)
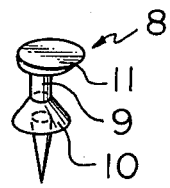 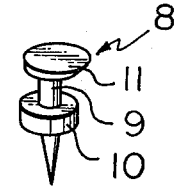
Fig. 3
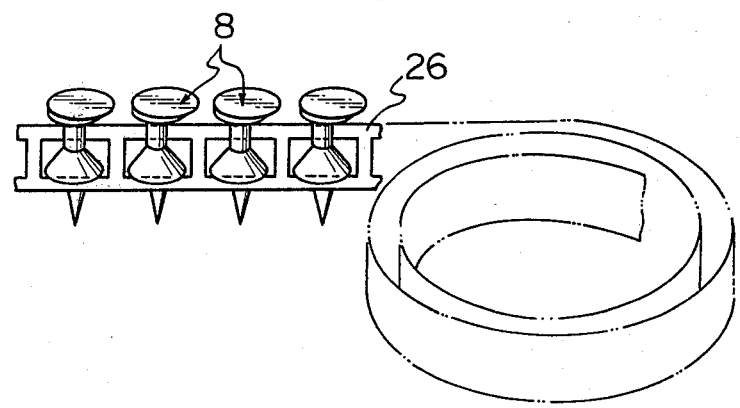

METHOD AND APPARATUS FOR CONDITIONING OF STEEL SURFACE

DESCRIPTION

Techinical Field

The present invention relates to a method and apparatus for conditioning of surface flaws of a red-hot steel material.

Background and Prior Art

In conditioning of surface flaws of a red-hot steel material such, for example, as a slab, a sheet or bar or the like, immediately after being delivered from a hot rolling mill, it is required to detect the position and size of each flaw, to properly mark the detected flaw before forwarding the material to the subsequent conditioning step, and to quickly and properly treat the marked flaw.

Many apparatuses such as an optical flaw detector, an ultrasonic flaw detector, an eddy current flaw detector and the like are used in practice for detecting surface flaws of a hot steel material such as a slab. In each of these apparatuses, it is necessary to accurately mark the detected flaws in order to properly remove the flaws in the subsequent step. The most suitable method for removing surface flaws of the hot steel material is scarfing. In order to carry out quickly a scarfing operation on a transfer line, it is necessary to form a molten pool instantaneously on the surface of the steel material.

In the case of surface flaw inspection of a cold steel material, many marking methods using things such as paint, powder, a label, grinding and the like can be applied and many apparatuses therefore have been devised. On the other hand, a marking method applicable to surface flaws of a red-hot steel material is to mark it with a special paint. However, the red-hot steel material is liable to form scales on the surface which are readily flaked during transfer. Accordingly, this marking method has a disadvantage that the makring may be made indistinct by flaking off of the scales after transfer.

Disclosure of Invention

The present invention is directed to a method and apparatus for marking the accurate position of a flaw by driving a nail of steel into it in response to a detection signal of a flaw detector for detecting surface flaws in a red-hot steel material, and for quickly conditioning the marked flaw by scarfing. In order to quickly condition the flaw in the red-hot steel material on a transfer line, it is necessary to produce a molten pool instantaneously on the surface of the steel material. According to the present invention, since the steel nail driven into the red-hot steel material is heated by the heat of the steel material and has its head protruding from the surface of the steel material, the required molten pool can be instantaneously produced by melting the nail upon conditioning the flaw by scarfing.

BRIEF DESCRIPTION OF DRAWINGS

The invention will be better understood from the following description taken in connection with the accompanying drawings in which:

FIG. 1 is a schematic block diagram of an apparatus for practising the method according to the present invention;

FIG. 2A and 2B are perspective views of different types of a marking nail for use in the method and apparatus according to the present invention;

FIG. 3 is a perspective veiw of a cartridge holding the nails;

BEST MODE FOR CARRYING OUT THE INVENTION

Figure 4A:
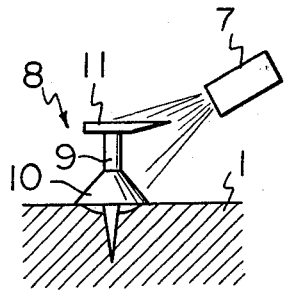
FIG. 4A is an illustration of the condition of the nail immediately after the beginning of the scarfing operaton.

Referring now to the drawings, particularly to FIG. 1, reference numeral 1 denotes a red-hot steel material, 2 denotes a flaw detecting unit, 3 denotes a detector head, 4 denotes a nail marking unit, 5 denotes a scarfing control unit, 6 denotes a scarfing unit, 7 denotes a scarfing torch, and 8 denotes a nail of steel for marking a flaw. These units are incorporated into an apparatus for carrying out the method according to the present invention, which is disposed, above a transfer line for the red-hot steel material 1 and immovable in the transfer direction thereof.

In flaw detection of the red-hot steel material 1 on the transfer line with the detector head 3, when a flaw detecting unit 2 detects a flaw the output signal is applied to the marking unit 4 after a delay time determined by the distance between the detector head 3 and the nail marking unit 4 and by the transfer speed of the red-hot steel material 1, thereby causing an accurate marking of the detected flaw by the steel nail 8. The output signal from the flaw detecting unit 2 is applied also to the scarfing control unit 5 which transmits a control signal to the scarfing unit 6 so as to cause it to start its scarfing operation after a delay time determined by the distance between the detector head 3 and the scarfing unit 6, by the transfer speed of the red-hot steel material 1, and by the marking time. Accordingly, the scarfing unit 6 is actuated when the scarfing torch 7 is in a position accurately opposite to the head of the nail 8.

A characteristic feature of the present invention resides in the use of the nail 8 of steel which is used for marking flaws. A mumber of steel nails 8 is driven into the flaw portion on the surface of the steel material 1 corresponding to the length of the detected flaw (the length in the advancing directon of the red-hot steel material 1 or in the scanning direction of the detector head 3).

The steel nail 8 used in the present invention for flaw marking is provided at an intermediate portion of its shaft 9 with a flange 10 of an umbrella-shape (see FIG. 2A) or of a disk-shape (see FIG. 2B). The flange 10 functions as a stop when the nail is driven into the red-hot steel material 1. The nail 8 has a head 11 at the top of the shaft 9. The nail head 11 is of an elliptical form which is thinner at the end of its major axis so as to be instantaneously melted when scarfing the nail 8 with the scarfing torch 7.

Figure 4B:
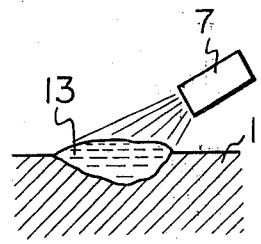
FIG. 4B is an illustration of a molten pool produced by melting the nail.

When the nail 8 is driven into the flaw of the steel material, the flange 10 acts as a stop so that the portion of the nail 8 above the flange 10 protrudes above the surface of the steel material, and the protruding portion of the nail instantaneously forms the molten pool upon scarfing. In the scarfing operation, as shown in FIG. 4A, when subjected to the flame from the scarfing torch 7, the thin portion of the nail head 11 is instantaneously melted and further the nail 8 itself which has been heated beforehand by the red-hot steel material 1 is melted quickly and forms a molten pool 13 thereabout as shown in FIG. 4B.

The driving of the nail to a depth of only 5 to 6 mm is sufficient. Accordingly, even if the material of the nail 8 is different from that of the steel 1, the nail 8 is removed by scarfing and there is no possibility of causing segregation on the surface of the steel material 1 by marking by the nail 8.

Figure 5:
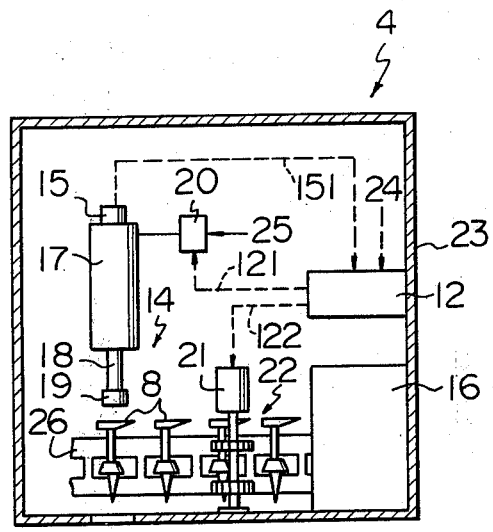
FIG. 5 is a side view of an embodiment of the marking unit according to the present invention.

An embodiment of the nail marking unit 4 will now be described with reference to FIG. 5. When a surface flaw detected by the scanning of the detector head 3 is found to require conditioning, a control unit 12 receives a marking pulse 24 from the flaw detecting unit 2 and a signal 151 of a rod position detector 15 of a nail driving cylinder 17 applies a nail drive operation signal 121 delayed for a time required to bring the flaw position into coincidence with the driving position of a marker 14. The marker 14 is provided with a header 19 at the lower end of a piston rod 18 of the nail driving cylinder 17 disposed vertically downwardly and with the rod position detector 15 at the upper end of the cylinder 17, and actuates the cylinder 17 with an electromagnetic valve 20 connected to said control unit 12. A nail feeder 22 comprises a cartridge 16 holding a tape 26 on which a number of the nails 8 are held and a feeding motor 21. These members are all mounted inside a heat resisting case 23.

When the flaw detected by the detector head 3 is found to require conditioning, the control unit 12 of the nail marking unit 4 receives the marking pulse 24 applied from the flaw detecting unit 2 and, only when the rod 18 is at a top dead center postion, supplies compressed air 25 to the nail driving cylinder 17 through the electromagnetic valve 20. The valve opening signal 121 to the electromagnetic valve 20 is delayed for a predetermined length of time by a delay circuit (not shown). The compressed air 25 is supplied to the cylinder 17 by the valve opening signal 121, whereby the rod 18 descends and the header 19 thereof drives one of the nails 8 positioned underneath thereof accurately into the position of the flaw in the red-hot steel material 1. When the rod position detector 151 detects the return of the ascending rod 18 to the top dead center, the output 151 from the detector 15 is applied to the control unit 12 which applies a command 122 to actuate the motor 21 so as to advance the tape 26 contained in the cartridge 16 by one frame and to cause the next one of the nails 8 to stand by at the operating position of the marker 14.

When the marking of the flaw is finished by driving the nail into the flaw position of the red-hot steel material 1 as described above, the scarfing unit 6 is actuated by the command signal from the scarfing control unit 5 to condition the flaw by scarfing.

Industrial Applicability

According to the present invention, a surface flaw in a red-hot steel material is detected by the flaw detecting unit, the nail marking unit is actuated by the detection signal from the detecting unit to automatically drive a nail into the flaw, and the scarfing unit is succeedingly actuated by the command signal to condition the flaw by scarfing. Therefore, the present invention has a great industrial applicability in that a series of operations such as detection, marking, and scarfing conditioning of a surface flaw in a red-hot material can be carried out on a transfer line without changing the speed thereof.

While we have shown and described specific embodiments of the invention, it will be understood that these embodiments are merely for the purpose of illustration and description and that various other forms may be devised within the scope of our invention, as defined in the appended claims.

We claim:

1. A method for conditioning of surface flaws of steel, comprising the steps of:
   detecting a surface flaw in a red-hot steel material;
   driving into said flaw steel nails in a number corresponding to the size of said flaw; and
   performing scarfing conditioning of said flaw starting from the nails.

2. An apparatus for conditioning of surface flaws of steel, comprising:
   a flaw detecting unit for detecting a surface flaw in a red-hot steel material;
   a nail marking unit for driving steel nails into said flaw in response to a signal from said flaw detecting unit; and
   a scarfing unit for performing scarfing conditioning of said flaw.

3. An apparatus for conditioning of surface flaws of steel as set forth in claim 2, characterized in that said steel nails are provided at an intermediate portion of its shaft with an umbrella- or a disk-shaped flange and at the top thereof with ahead of an elliptical form which is thinner at an end of the major axis thereof.

4. An apparatus for conditioning of surface flaws of steel as set forth in claim 2, characterized in that said steel nails are held in a tape at a predetermined distance from one another and said tape is contained in a cartridge.

* * * * *